M. THENIS.
PIPE.
APPLICATION FILED DEC. 31, 1919.
1,418,746.
Patented June 6, 1922.
Fig. 1.
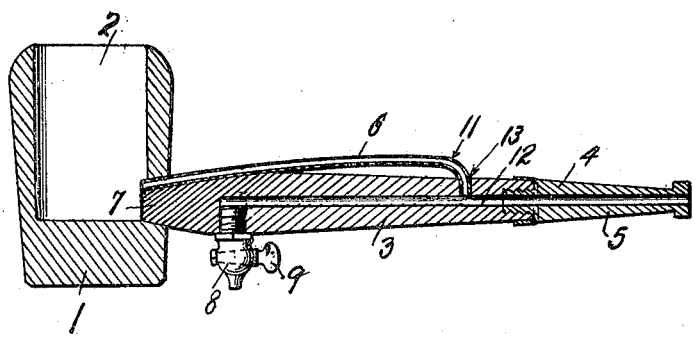
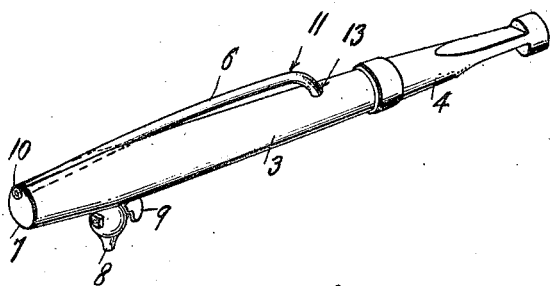
Fig. 2.
Inventor
Matthias Thenis
Witnesses
Ernest O. Crocker
Chas. E. Smith
By Richard B. Owen,
Attorney

UNITED STATES PATENT OFFICE.

MATTHIAS THENIS, OF NORTH VERNON, INDIANA.

PIPE.

1,418,746.  Specification of Letters Patent.  Patented June 6, 1922.

Application filed December 31, 1919. Serial No. 348,530.

*To all whom it may concern:*

Be it known that I, MATTHIAS THENIS, a citizen of the United States, residing at North Vernon, in the county of Jennings and State of Indiana, have invented certain new and useful Improvements in Pipes, of which the following is a specification.

This invention relates to a smoking pipe and has the following objects: To provide a pipe stem which will allow the smoke to be easily drawn from the bowl of the pipe and at the same time prevent the passage of moisture through said stem; to provide a stem equipped with a supplementary tube through which the smoke from the bowl may be drawn into the mouth of the smoker; to provide a supplementary channel in the pipe stem whereby the moisture from the mouth may collect so that same may be emptied by means of a pet cock.

With the above and other objects in view this invention consists of certain novel combinations, constructions, and arrangement of parts as will be hereinafter more fully described.

In the drawings:—

Figure 1 is a longitudinal section taken through my invention, and

Figure 2 is a perspective view of the stem and mouth piece.

By referring to the accompanying drawings by numerals it will be seen that 1 represents a pipe bowl constructed in the usual manner having the hollowed out portion 2. Adjacent the bottom of the hollowed out portion 2 there is provided an aperture for receiving the stem 3. Threadedly mounted upon the stem 3 there is the mouth piece 4 which has the usual channel 5 therein.

A distance from this bowl end 7 of the stem 3 there is provided a threaded opening for receiving the pet cock 8 which is provided with the valve 9. The channel 12 it will be seen extends from the pet cock 8 to the mouth piece 4 to register with the channel 5. A distance from the threaded end of the stem there is provided an opening extending at right angles to the channel 12. Adjacent the end 7 and upon the upper periphery of the stem 3 there is provided a tapering channel 10. The metallic tube 6 is adapted to fit in the channel 10 and the opening 13 as is clearly shown in Figure 1 of the drawing. It will be noticed that when the stem is in a horizontal position that the slant in the tube 6 will be downwardly from the point 11 to the bowl of the pipe. This incline will naturally be greater because it is natural for one when smoking to hold the bowl somewhat lower than any moisture which might accidentally be drawn up through the tube 6 will naturally flow back into the bowl or into channel 12 because of the action of gravity and not be sucked into the smoker's mouth.

It should be understood that the stem shown in Fig. 2 of the drawing may be used with a bowl of most any construction the end 7 adjacent the bowl might be provided with threads if so desired in view of the fact that the tapering channel 10 is deepest adjacent this end 7 of the stem 3. It will also be seen that the tube 6 may be easily removed for cleaning same when so desired.

It will be readily understood that the channel 5 in the mouth piece 4 registers with the channel 12 in the stem 3. This channel 12 runs longitudinally of the stem and stops a distance from the end 7 so as to lead into the pet cock 8. From such a construction it will be readily understood that any moisture from the smoker's mouth will pass through the channels 5 and 12 into the pet cock 8. It being quite impossible for any of this moisture to pass through the tube 6. From such a construction it will be readily understood that it will be quite impossible for any moisture to flow from the smoker's mouth to the bowl of the pipe.

From the above description it will be seen that a pipe stem has been disclosed which may be cheaply manufactured and may be used with pipe bowls of usual construction. The stem being provided with simple and efficient means for preventing the moisture from being sucked back into the smoker's mouth and what moisture accumulates in the bottom of the bowl may be easily removed therefrom.

Having thus fully described my invention what I claim as new and desire to secure by Letters Patent, is:—

1. A pipe stem of the class described provided with a threaded end for receiving a mouth piece, a longitudinally extending channel provided within said stem so as to communicate with said mouth piece and to terminate a distance from the other end of said stem, a pet cock communicating with said channel, a tapering groove provided in the surface of said stem and adjacent the bowl end therefor and a tube lying in said groove and extending over said stem and bent downwardly so as to communicate with said channel.

2. A pipe stem of the class described provided with a longitudinally extending channel terminating a distance from one end thereof, a pet cock communicating with said channel, said stem provided with a tapering groove adjacent the aforementioned end which is adapted to receive a bowl and a tube having one terminal lying in said groove and its other terminal in communication with said channel.

In testimony whereof I affix my signature in presence of two witnesses.

MATTHIAS THENIS.

Witnesses:
  C. F. SCHWACKE,
  C. H. GRAYLIEL.